(12) United States Patent
Kaneko et al.

(10) Patent No.: US 7,808,529 B2
(45) Date of Patent: Oct. 5, 2010

(54) IMAGE PICKUP APPARATUS WITH FRAME ADDITION

(75) Inventors: Katsumi Kaneko, Kanagawa (JP);
Takashi Tsuchiya, Tokyo (JP);
Motohiro Nakasuji, Kanagawa (JP);
Kazuhiro Sugeno, Kanagawa (JP);
Fumihiko Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1256 days.

(21) Appl. No.: 10/891,858

(22) Filed: Jul. 15, 2004

(65) Prior Publication Data

US 2005/0046701 A1 Mar. 3, 2005

(30) Foreign Application Priority Data

Jul. 18, 2003 (JP) ............................. 2003-276804

(51) Int. Cl.
*H04N 5/225* (2006.01)
*H04N 5/228* (2006.01)

(52) U.S. Cl. .................................. 348/218.1; 348/222.1

(58) Field of Classification Search ................. 348/222, 348/232, 239, 240, 459, 231, 362; 386/109, 386/117
See application file for complete search history.

(56) References Cited

U.S. PATENT DOCUMENTS 6,177,958 B1 * 1/2001 Anderson .................... 348/362
6,614,477 B1 * 9/2003 Lee et al. ..................... 348/312
2002/0021364 A1 * 2/2002 Asada et al. ................. 348/312
2002/0051643 A1 * 5/2002 Nakashita .................... 396/429
2003/0103158 A1 * 6/2003 Barkan et al. ............... 348/362
2004/0081437 A1 * 4/2004 Asada et al. ................. 386/131
2005/0163492 A1 * 7/2005 Ueda et al. .................. 386/109

FOREIGN PATENT DOCUMENTS

| JP | 9 284628 | 10/1997 |
| JP | 2000 69352 | 3/2000 |
| JP | 2000 236473 | 8/2000 |
| JP | 2000 324382 | 11/2000 |
| JP | 2003-32555 | 1/2001 |
| JP | 2002 314873 | 10/2002 |

\* cited by examiner

*Primary Examiner*—Sinh Tran
*Assistant Examiner*—Selam Gebriel
(74) *Attorney, Agent, or Firm*—Frommer Lawrence & Haug LLP; William S. Frommer; Thomas F. Presson (57) ABSTRACT

A preprocessor performs a signal processing operation by using an image signal DVa generated by picking up a subject image. A frame adder adds frames of an image signal DVb generated by the preprocessor so as to generate an image signal DVc with a changed frame rate. When changing the setting of the signal processing operation of the preprocessor, the signal processing operation is restarted with the new setting at the start or at the end of a frame addition period (in units of frame addition periods) of the frame adder based on a determination signal indicating the frame addition period.

6 Claims, 6 Drawing Sheets

| SET FRAME RATE FRc | NUMBER OF FRAMES ADDED FA | IMAGING FRAME RATE FRp = FRc × FA |
|---|---|---|
| $60P \geq FRc > 30P$ | 1 | $60P \geq FRp > 30P$ |
| $30P \geq FRc > 20P$ | 2 | $60P \geq FRp > 40P$ |
| $20P \geq FRc > 15P$ | 3 | $60P \geq FRp > 45P$ |
| $15P \geq FRc > 12P$ | 4 | $60P \geq FRp > 48P$ |
| $12P \geq FRc > 10P$ | 5 | $60P \geq FRp > 50P$ |
| $10P \geq FRc > 6P$ | 6 | $60P \geq FRp > 36P$ |
| $6P \geq FRc > 5P$ | 10 | $60P \geq FRp > 50P$ |
| $5P \geq FRc > 4P$ | 12 | $60P \geq FRp > 48P$ |
| $4P \geq FRc > 3P$ | 15 | $60P \geq FRp > 45P$ |
| $3P \geq FRc > 2P$ | 20 | $60P \geq FRp > 40P$ |
| $2P \geq FRc > 1P$ | 30 | $60P \geq FRp > 30P$ |
| 1P | 60 | 60P |

IMAGE PICKUP APPARATUS WITH FRAME ADDITION

BACKGROUND OF THE INVENTION

1. Field of the Invention

The present invention relates to image pickup apparatuses. More particularly, the invention relates to an image pickup apparatus suitable for performing imaging by changing the frame rate of an image signal after conducting signal processing, and more specifically, to an image pickup apparatus suitable for changing the setting of a signal processing operation in units of frame addition periods of a frame adder.

2. Description of the Related Art

Conventionally, in film production, to achieve special video effects, filming is performed while changing the speed of filming with a film camera, that is, changing the number of frames per second. For example, when filming is performed faster than normal speed and when playback operation is performed at normal speed, slow-motion playback images can be obtained. With this technique, high speed operation, such as a scene in which droplets are falling onto a water surface, can be easily and meticulously observed. Conversely, when filming is performed slower than normal speed and when playback operation is performed at normal speed, fast-motion playback images can be obtained. With this technique, a sense of speed in, for example, battle scenes or car chase scenes, can be increased so that the scenes become more realistic and have a greater impact.

In television program production, imaging, editing, and transmission of programs is being digitized. Due to the development of digital technologies, the image quality is becoming higher and the cost of devices for producing programs is becoming lower, and digitization of film production is also improving.

When performing imaging with an image pickup apparatus (video camera) in accordance with the digitization of film production, to obtain special video effects, not only image signals obtained by imaging with normal speed, but also image signals obtained by imaging at higher speeds or lower speeds, are recorded in a storage device, for example, a server. Then, image signals representing frame images required for obtaining special video effects are read out from the storage device, and image processing is performed on the read image signals, thereby producing special video effects.

To obtain special video effects, such as fast-motion playback images and slow-motion playback images, some image pickup apparatuses can change the frame rate during the imaging operation. Such an image pickup apparatus is disclosed in, for example, Japanese Unexamined Patent Application Publication No. 2000-125210. By using this image pickup apparatus, when imaging at a frame rate lower than a predetermined frame rate and when performing playback at the predetermined frame rate, fast-motion playback images can be easily obtained. In contrast, when imaging at a frame rate higher than a predetermined frame rate and when performing playback at the predetermined frame rate, slow-motion playback images can be easily obtained.

The frame rate can also be changed by performing frame addition processing. For example, when adding n frames of an image signal, the frame rate becomes 1/n.

SUMMARY OF THE INVENTION

When performing the imaging operation by using an image pickup apparatus, various signal processing operations, such as white balance control, gain control, and shading correction, are performed to obtain imaging signals exhibiting high sensitivity and high color reproducibility with small noise. When changing the settings of such signal processing operations by the user, the settings are changed in units of frames (i.e., at the start or the end of a frame) so that they are not changed during the same frame image.

However, as described above, the frame rate can be changed by frame addition processing. During this processing, if the setting of the signal processing operation is changed while frames are being added, an image signal after frame addition processing does not reflect a change of the setting, thereby making a resulting image unnatural. For example, if the setting of the signal processing operation is changed while adding the second frame of an image signal during two-frame addition, a resulting image signal after the frame addition processing does not reflect the new setting.

Accordingly, it is an object of the present invention to provide an image pickup apparatus that can generate an image signal reflecting a new setting of an image processing operation even if the frame rate is changed during frame addition processing.

In order to achieve the above-described object, the present invention provides an image pickup apparatus including: an image pickup portion for picking up a subject image to generate an image signal; a signal processing portion for performing a signal processing operation by using the image signal generated by the image pickup portion; a frame addition portion for conducting frame addition by using the image signal generated by the signal processing portion; and a control portion for setting the operation of the signal processing portion. The signal processing portion changes the signal processing operation in units of frame addition periods of the frame addition portion.

In the present invention, the signal processing operation is performed by using an image signal generated by picking up a subject image. Then, frames of the image signal obtained by performing the signal processing operation are added to change the frame rate. When an instruction to change the setting of the signal processing operation is given, the signal processing operation is restarted with the new setting from an image signal in the frame addition period after the instruction is given. Alternatively, an instruction is given to the signal processing portion to change the setting of the signal processing operation at the start or at the end of the frame addition period.

With this configuration, the signal processing operation is not changed while frames are being added, and the resulting image reflects the new setting of the signal processing operation.

To perform the shutter operation, shutter open periods are continuously set in the frame addition period, thereby preventing the occurrence of pseudo-contour.

DESCRIPTION OF THE PREFERRED EMBODIMENTS

The present invention is described in detail below with reference to the accompanying drawings through illustration of a preferred embodiment.

Figure 1:
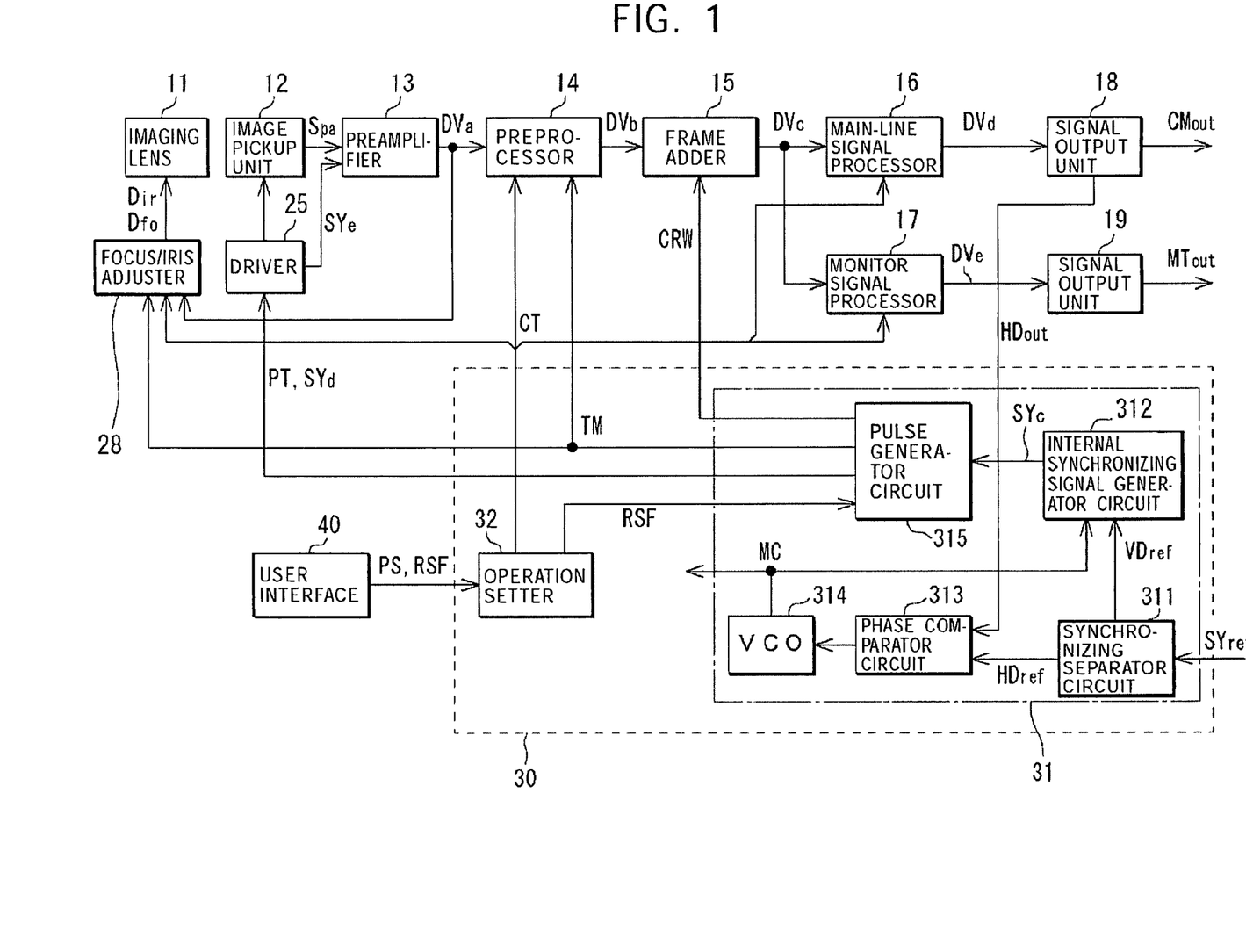
FIG. 1 is a block diagram illustrating an example of the configuration of an image pickup apparatus according to the present invention.

Reference is first made to FIG. 1 which illustrates an image pickup apparatus 10. On the imaging surface of an image pickup device (not shown) forming an image pickup unit 12, an image of a subject generated from light incident on the imaging surface through an imaging lens 11 is formed. The image pickup device photoelectrically converts the subject image into imaging electric charge, and further converts the imaging electric signal into a voltage signal based on a drive control signal DR supplied from a driver 25, which is described below. The image pickup device then supplies this voltage signal into a preamplifier 13 as an imaging signal Spa.

The preamplifier 13 amplifies the imaging signal Spa and then performs processing for removing noise, for example, correlated double sampling. The preamplifier 13 converts the imaging signal into a digital signal, and then performs feedback clamping on the digital signal so as to generate an image signal having a required signal level and a stabilized black level. The preamplifier 13 further performs flare correction to correct the image signal for the signal level. Defects of the image pickup device are also corrected by the preamplifier 13. The preamplifier 13 performs the above-described processing based on a synchronizing signal SYe supplied from the driver 25, and supplies a processed image signal DVa to a preprocessor 14 together with the synchronizing signal and also supplies the image signal DVa to a focus/iris adjuster 28.

The preprocessor 14, a frame adder 15, a main-line signal processor 16, and a monitor signal processor 17 also perform processing based on the corresponding synchronizing signals (not shown), and supply resulting image signals and the corresponding synchronizing signals to the subsequent elements.

The preprocessor 14 performs signal processing operations on the image signal DVa, for example, white balance control, gain correction, and white shading correction, to generate an image signal DVb. The image signal DVb is then supplied to the frame adder 15. The signal processing operations performed by the preprocessor 14 are set based on a setting signal CT supplied from an operation setter 32 of a controller 30, which is described below. If a signal processing operation is changed by the setting signal CT from the operation setter 32, such a change is reflected in an image signal after performing frame addition processing by the frame adder 15 by using a determination signal TM supplied from a pulse generator circuit 315 of a signal generator 31. The signal generator 31 forms the controller 30.

The frame adder 15 performs frame addition on the image signal DVb by using random access memories (RAMs) so as to change the frame rate of the image signal DVb. If, for example, three frames are added, the first frame of the image signal DVb is stored in a RAM-1. Then, the signal stored in this RAM-1 is read out and is added to the second frame of the image signal DVb, and the resulting addition signal is stored in a RAM-2. The addition signal stored in the RAM-2 is then read out and is added to the third frame of the image signal DVb, and the resulting addition signal is stored in a RAM-3. The signal stored in the RAM-3 is a signal obtained by adding three frames of the image signal DVb, and if the level of this signal is multiplied by ⅓, a signal having a required level with ⅓ the frame rate can be obtained.

Similarly, the fourth frame of the image signal DVb is stored in the RAM-1. Then, the signal stored in the RAM-1 is read out and is added to the fifth frame of the image signal DVb, and the resulting addition signal is then stored in the RAM-2. The addition signal stored in the RAM-2 is read out and is added to the sixth frame of the image signal DVb, and the resulting addition signal is then stored in the RAM-3. The signal stored in the RAM-3 is a signal obtained by adding three frames of the image signal DVb, and if the level of this signal is multiplied by ⅓, a signal having a required level with ⅓ the frame rate can be obtained. In this manner, an image signal DVc having a required signal level obtained by adding three frames of the image signal DVb can be generated.

The above-described frame addition can also be performed by using a frame delay circuit. For example, the first frame of the image signal DVb is delayed by two frame periods in the frame delay circuit, and then, the second frame of the image signal DVb is delayed for one frame period in the frame delay circuit. The delayed first frame and second frame of the image signal DVb are then added to the third frame of the image signal DVb, thereby obtaining the three added frames of the image signal DVb. If the level of this signal is multiplied by ⅓, the image signal DVc having a required level with ⅓ the frame rate of the image signal DVb can be obtained.

By performing the frame addition as described above, when the frame rate of the image signal DVb is 60P (which means that there are 60 frames per second and P indicates a progressive-scanning signal and the same applies to other indications), the image signal DVc having the frame rate 30P can be obtained if the number of frames added is two. If the number of frames added is four, the image signal DVc having the frame rate 15P can be obtained.

In addition to the switching of the number of frames added, the signal to be read out from the image pickup device can be controlled so as to change the frame rate of the imaging signal Spa. Then, the frame rate of the image signal DVc can be sequentially changed.

The image signal DVc having a desired frame rate obtained in the frame adder 15 is supplied to the main-line signal processor 16 and the monitor signal processor 17.

The main-line signal processor 16 performs processing operations, such as gamma (γ) correction, contour compensation, and knee correction, on the image signal DVc supplied from the frame adder 15. The resulting image signal DVd is supplied to a signal output unit 18.

The monitor signal processor 17 performs processing operations in accordance with an image display device connected to the image pickup apparatus 10 for the user to check the images. For example, if the images are displayed on an image display device using a cathode ray tube or a liquid crystal display, the monitor signal processor 17 performs processing operations in accordance with the γ characteristic and the grayscale display characteristic of the cathode ray tube or the liquid crystal display. An image signal DVe obtained in the monitor signal processor 17 is supplied to a signal output unit 19.

The signal output unit 18 converts the image signal DVd into a signal CMout compatible with a device, for example, a recorder, connected to this image pickup apparatus 10. For example, if the image pickup apparatus 10 is connected to a device compatible with component signals or composite signals, the signal output unit 18 converts the image signal DVd into the signal CMout compatible with the corresponding device. If image signals are transmitted via a serial digital interface standardized as SMPTE259M or SMPTE292M, the image signal DVd is converted into a transmission signal compatible with the interface standards and is output as the signal CMout. A horizontal synchronizing signal HDout is extracted from a synchronizing signal SYout synchronized with the signal CMout, and is supplied to a phase comparator circuit 313 of the signal generator 31.

The signal output unit 19 converts the image signal DVe into a signal MTout compatible with an image display device for checking images. For example, if the image display device handles analog signals, the signal output unit 19 converts the image signal DVe into an analog signal and outputs it as the signal MTout.

A synchronizing separator circuit 311 of the signal generator 31 separates a vertical synchronizing signal VDref from a reference synchronizing signal SYref supplied from a camera controller (not shown), and supplies the vertical synchronizing signal VDref to an internal synchronizing signal generator circuit 312. The synchronizing separator circuit 311 also separates a horizontal synchronizing signal HDref from the reference synchronizing signal SYref, and supplies it to the phase comparator circuit 313.

The internal synchronizing signal generator circuit 312 generates a synchronizing signal SYc in synchronization with the vertical synchronizing signal VDref by using an oscillation signal MC supplied from a voltage-controlled oscillator (VOC) 314, which is described below, and supplies the synchronizing signal SYc to the pulse generator circuit 315.

The phase comparator circuit 313 determines the phase difference between the horizontal synchronizing signal HDout contained in the signal CMout output from the signal output unit 18 and the horizontal synchronizing signal HDref supplied from the synchronizing separator circuit 311, and controls the frequency of the oscillation signal MC generated in the VOC 314 so that the phase difference can be eliminated.

The pulse generator circuit 315 leads the phase of the synchronizing signal SYc supplied from the internal synchronizing signal generator circuit 312 by the amount equal to the phase difference between the synchronizing signal SYd, which is a reference signal for driving the image pickup unit 12, and the synchronizing signal SYout of the image signal output from the signal output unit 18. The pulse generator circuit 315 then supplies the resulting synchronizing signal SYc to the driver 25 as the synchronizing signal SYd. Accordingly, the synchronizing signal SYout becomes synchronized with the synchronizing signal SYc. The frequency of the oscillation signal MC is controlled so that the horizontal synchronizing signal HDout is in phase with the horizontal synchronizing signal HDref. Then, the signal CMout output from the signal output unit 18 can be synchronized with the reference synchronizing signal SYref.

A frame rate setting signal RSF is supplied to the pulse generator circuit 315 from the operation setter 32. The pulse generator circuit 315 then supplies a timing signal PT for adjusting the imaging frame rate of the image pickup unit 12 to the driver 25 so that the signal CMout output from the signal output unit 18 can be the frame rate represented by the frame rate setting signal RSF. The pulse generator circuit 315 also generates a pulse signal CRW for controlling the reading and writing of an image signal from and into RAMs and supplies the pulse signal CRW to the frame adder 15 so that a required number of frames of the image signal DVb are added in the frame adder 15 so as to generate the image signal DVc. When the frame addition processing is performed in the frame adder 15, the pulse generator circuit 315 generates the determination signal TM indicating the frame addition period, and supplies it to the preprocessor 14 and the focus/iris adjuster 28.

The driver 25 generates the drive control signal DR for driving the image pickup device of the image pickup unit 12 based on the supplied synchronizing signal SYd, and supplies the drive control signal DR to the image pickup unit 12. The driver 25 also generates the drive control signal DR based on the timing signal PT to drive the image pickup device so that the imaging signal Spa having a variable frame rate can be generated. The driver 25 also supplies the synchronizing signal SYe for the imaging signal Spa to the preamplifier 13. Alternatively, the pulse generator circuit 315 may lead the phase of the horizontal synchronizing signal contained in the synchronizing signal SYc by the amount equal to the phase difference between the synchronizing signal SYd and the synchronizing signal SYout. The pulse generator circuit 315 then supplies the resulting horizontal synchronizing signal to the driver 25 to control it to generate the synchronizing signal SYe. Information for setting the frame rate of the imaging signal Spa may be supplied to the driver 25 from the operation setter 32. Then, the driver 25 can generate a signal for driving the image pickup device based on this information.

The focus/iris adjuster 28 determines the level of the image signal DVa and generates an iris adjusting signal Dir based on the determined level. The iris adjusting signal Dir is supplied to the imaging lens 11 to control the diaphragm of the imaging lens 11, thereby adjusting the iris. The focus/iris adjuster 28 also detects high frequency components contained in the image signal DVa, and generates a focus adjusting signal Dfo so that the high frequency components can be maximized. The focus/iris adjuster 28 supplies the focus adjusting signal Dfo to the imaging lens 11 and drives it to perform focus adjustment. The above-described iris adjustment and focus adjustment are performed in units of frame addition periods represented by the determination signal TM or in units of frames. The setting signal CT determines whether to perform adjustment in units of frame addition periods or in units of frames.

A user interface 40 is connected to the operation setter 32 of the controller 30. Upon receiving an operation signal PS in response to a user operation through this user interface 40, the operation setter 32 generates the setting signal CT based on this operation signal PS to set the operations of the individual elements. As a result, the image pickup apparatus 10 can be operated in response to the user operation. Upon receiving the frame rate setting signal RSF for setting the frame rate of the signal CMout output from the signal output unit 18 through the user interface 40, for example, upon receiving the frame rate setting signal RSF through the user interface 40 as the operation signal PS after switching the frame rate in an operation unit, or upon receiving the frame rate setting signal RSF from a remote controller or an external device, the operation setter 32 supplies the frame rate setting signal RSF to the pulse generator circuit 315.

Figure 2:
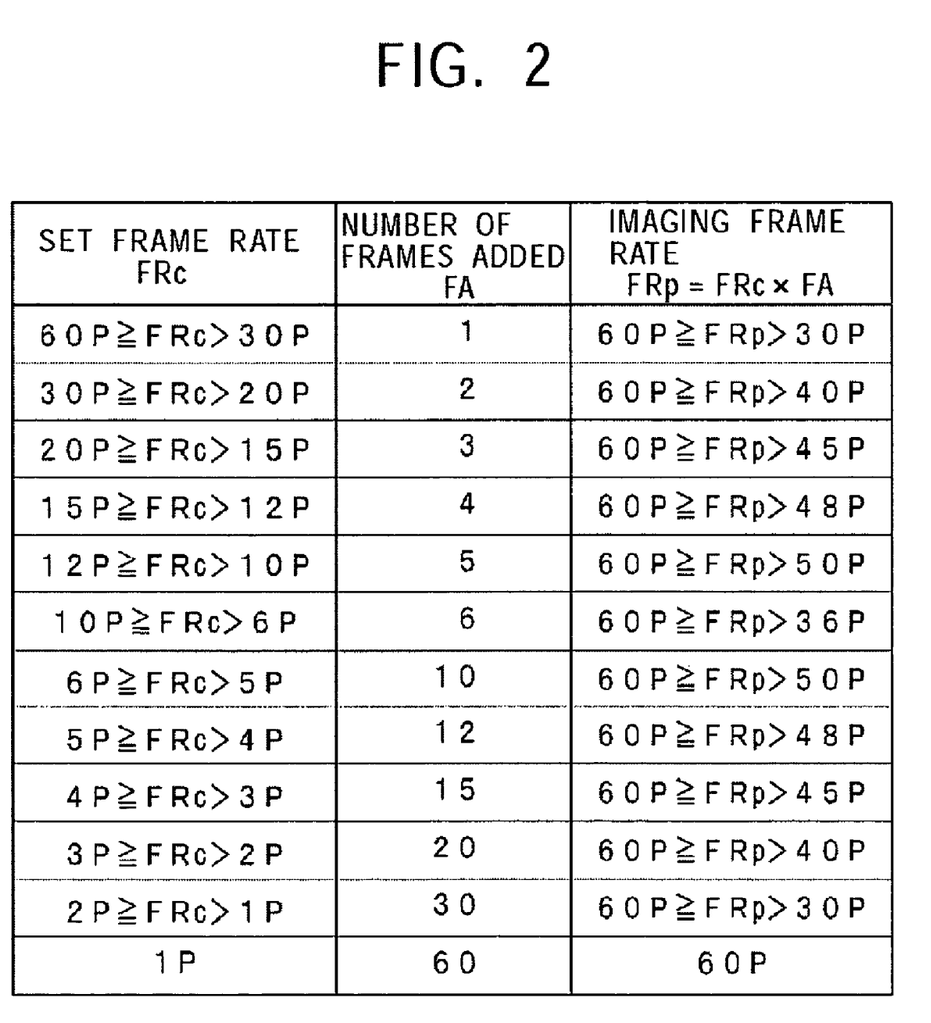
FIG. 2 illustrates the relationship of the number of frames added and the imaging frame rate to the set frame rate.

The operation of the image pickup apparatus 10 is as follows. The frame rate (set frame rate) set by the frame rate setting signal RSF can be sequentially changed by switching the frame rate (imaging frame rate FRp) of the imaging signal Spa generated in the image pickup unit 12 and the number of frames added FA in the frame adder 15. For example, as shown in FIG. 2, when the set frame rate FRc is set as $60P \geqq FRc > 30P$ by the frame rate setting signal RSF, the number of frames added FA is set to be 1 so that the imaging frame rate FRp becomes equal to the set frame rate FRc. When the set frame rate FRc is set as $30P \geqq FRc > 20P$, the number of frames added FA is set to be 2 so that the imaging frame rate FRp is twice as high as the set frame rate FRc. When the set frame rate FRc is set as $20P \geqq FRc > 15P$, the number of frames added FA is set to be 3 so that the imaging frame rate FRp is three times as high as the set frame rate FRc.

Similarly, the imaging frame rate FRp and the number of frames added FA can be switched to set the set frame rate FRc.

When changing the frame rate of the imaging signal Spa, the electric charge storage period in the image pickup device or the reading timing of the electric charge can be controlled by the drive control signal DR supplied from the driver 25 to the image pickup unit 12. When changing the imaging frame rate FRp, a common data rate (CDR) (common sampling frequency)) system can be used for adjusting the horizontal blanking period or the vertical blanking period. With this arrangement, the image size of the imaging signal Spa in the effective frame period is not changed even if the imaging frame rate FRp is varied. With the use of the CDR system, the operating frequencies of the elements using the imaging frame rate FRp do not have to be changed even if the imaging frame rate FRp is varied. Thus, the configuration of the image pickup apparatus 10 can be simplified.

Figure 3:
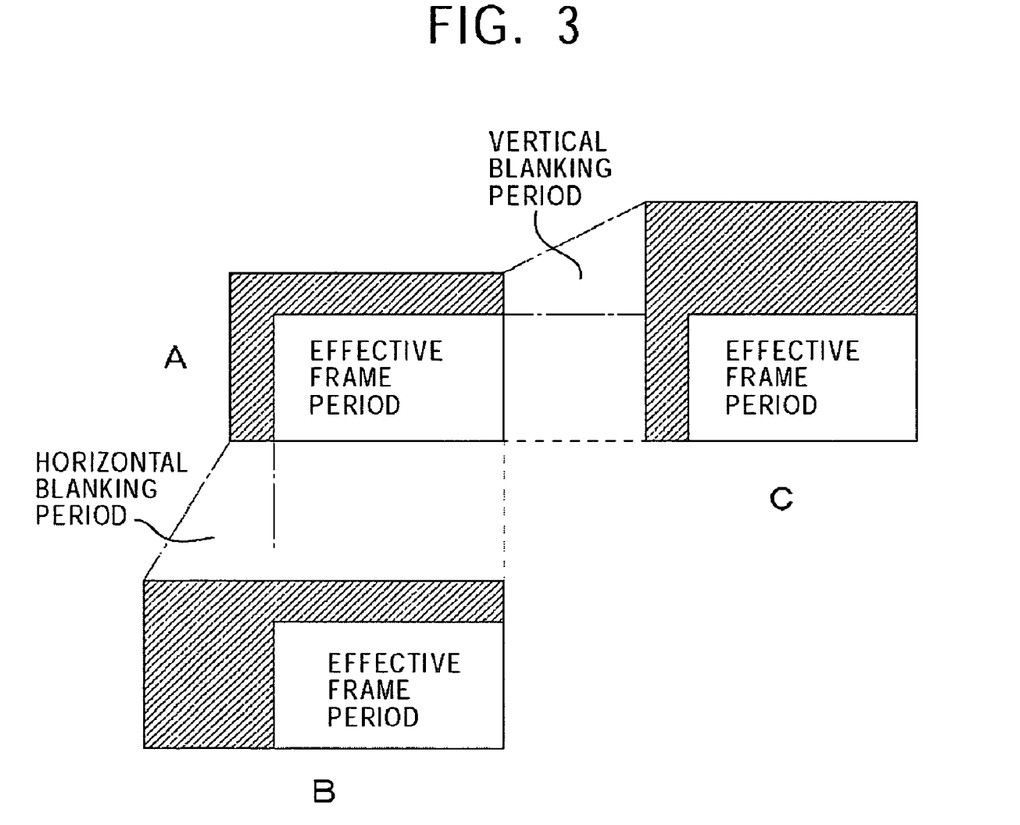
FIG. 3 illustrates a common data rate (CDR) system.

The CDR system is discussed briefly below. An image signal having the horizontal and vertical blanking periods and the effective frame period, as indicated by A of FIG. 3, is shown. By adjusting the horizontal blanking period as indicated by B of FIG. 3 or by adjusting the vertical blanking period as indicated by C of FIG. 3, the frame rate FRp of the imaging signal Spa can be changed without changing the image size of the effective frame period. When changing the imaging frame rate FRp, the number of samples per line can be changed so that the imaging signal Spa having an adjusted horizontal blanking period can be generated. Alternatively, if the number of lines of one frame can be changed in accordance with the imaging frame rate FRp, the imaging signal Spa having an adjusted vertical blanking period can be generated.

Figure 4:
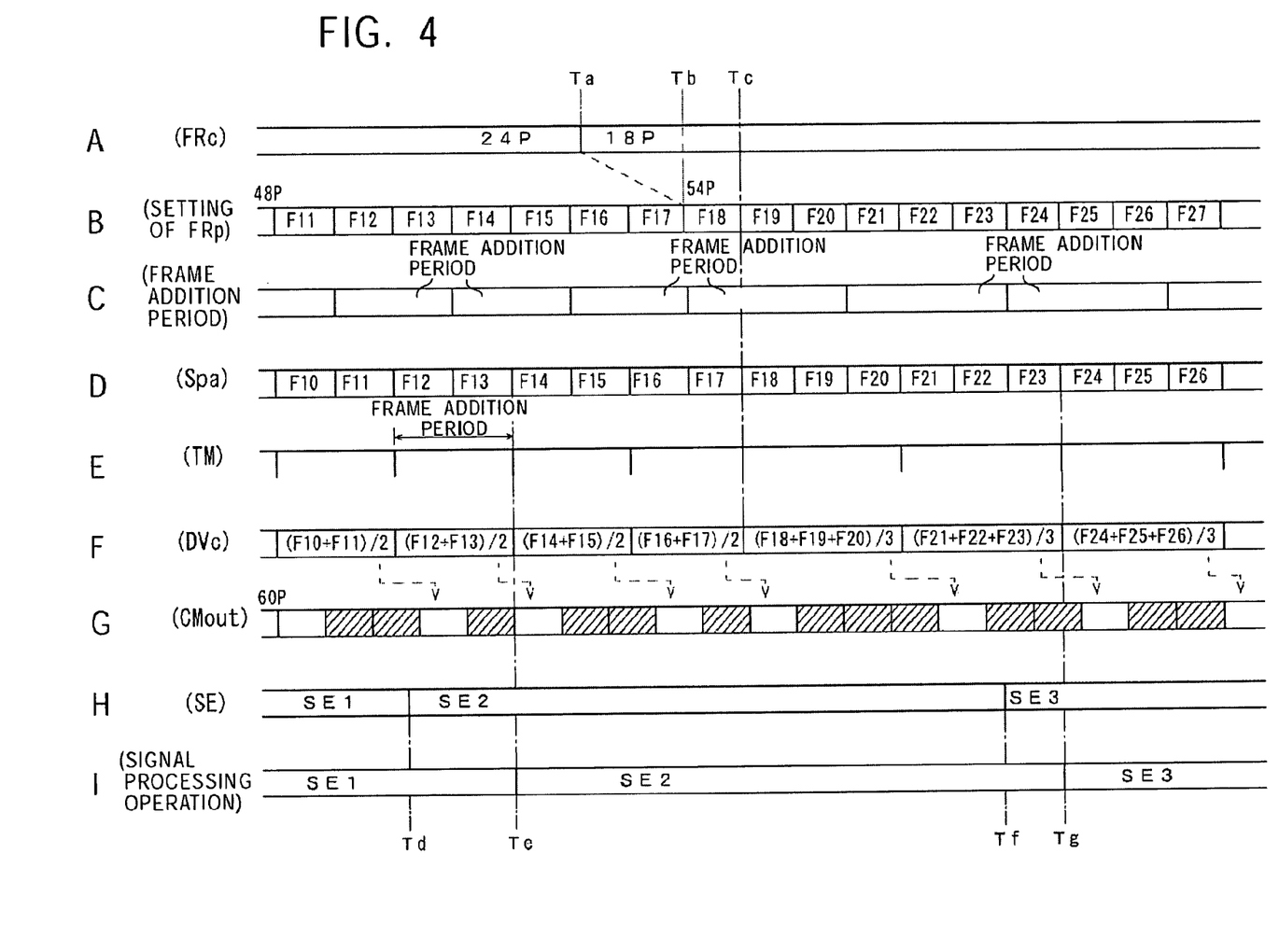
FIG. 4 illustrates the operation of the image pickup apparatus.

FIG. 4 illustrates the operation of the image pickup apparatus 10. In FIG. 4, A indicates the set frame rate FRc set by the frame rate setting signal RSF. When the set frame rate FRc is changed from 24P to 18P at time ta, the setting of the imaging frame rate FRp is changed from 48P to 54P at time tb, which is the end of the frame addition period, as indicated by B of FIG. 4, according to the timing signal PT from the pulse generator circuit 315. The frame addition period determined based on the set frame rate FRc indicated by A of FIG. 4 is shown in C of FIG. 4.

The image pickup unit 12 accumulates electric charge at the set imaging frame rate FRp, and outputs a signal in accordance with the accumulated electric charge in the next frame. Accordingly, as represented by D of FIG. 4, the imaging signal Spa having the imaging frame rate set at time tb is output in the next frame at time tc.

When the imaging frame rate FRp is changed as described above, the new setting is reflected in the subsequent frame. Accordingly, the frame addition period of the image signal DVb is delayed by one frame from the frame addition period indicated by C of FIG. 4. The signal indicating the frame addition period delayed by one frame designated by E of FIG. 4 is generated in the pulse generator circuit 315 and is supplied to the preprocessor 14 as the determination signal TM.

The frame adder 15 performs frame addition by using the image signal DVb during the frame addition period represented by the determination signal TM shown in E of FIG. 4. By reading out the resulting signal at a required signal level, the image signal DVc having the frame rate set by the frame rate setting signal RSF can be generated, as indicated by F of FIG. 4. If the signal indicated by F of FIG. 4 is read out at the output frame rate in accordance with a device connected to the image pickup apparatus 10, the signal CMout containing 24 frames out of the 60 frames is output, as indicated by G of FIG. 4, when the frame rate is set to be 24P by the frame rate setting signal RSF. When the frame rate is set to be 18P, the signal CMout containing 18 frames out of the 60 frames is output.

When the setting SE of the signal processing operation performed by the preprocessor 14 is changed from SE1 to SE2 at time td, as indicated by H of FIG. 4, the preprocessor 14 starts the signal processing operation with new setting SE2 at time te, which is the end of the frame addition period, based on the determination signal TM, as designated by I of FIG. 4. Accordingly, the setting of the signal processing operation is not changed from SE1 to SE2 while frames are being added.

Similarly, when the setting SE is changed from SE2 to SE3 at time tf, the preprocessor 14 starts the signal processing operation with new setting SE3 at time tg, which is the end of the frame addition period. Accordingly, the setting of the signal processing operation is not changed from SE2 to SE3 while frames are being added.

As described above, when an instruction to change the setting of the signal processing operation is given, the signal processing operation is restarted at the new setting at the start of the next frame addition period (in units of frame addition periods). Accordingly, frames of an image signal before changing the setting and frames of an image signal after changing the setting are not added. Thus, the resulting image looks natural by reflecting the new setting. If the preprocessor 14 automatically starts white balance control, auto white balance control can be performed in units of frame addition periods.

The operator can select by the setting signal CT whether focus adjustment or iris adjustment in the focus/iris adjuster 28 is performed in units of frames (frame mode) or in units of frame addition periods (frame addition period mode) so as to conduct optimal focus adjustment or iris adjustment. For example, if focus adjustment or iris adjustment which is currently performed in the frame mode cannot follow the image signal DVa, the operation is switched to the frame addition period mode. In this case, since the interval for conducting adjustments becomes longer, focus adjustment or iris adjustment can be conducted while following the image signal DVa. In contrast, if the response characteristic of focus adjustment or iris adjustment which is currently performed in the frame addition period mode is decreased, the operation is switched to the frame mode. Then, the interval for conducting adjustments becomes shorter, and the response characteristic is improved. The focus/iris adjuster 28 may be adapted to perform focus adjustment or iris adjustment at any time based on the image signal DVa.

If the determination signal TM is supplied to the main-line signal processor 16 or the monitor signal processor 17, though it is not shown, the signal processing operation of the main-line signal processor 16 or the monitor signal processor 17 can be conducted in the units of frame addition periods.

Figure 5:
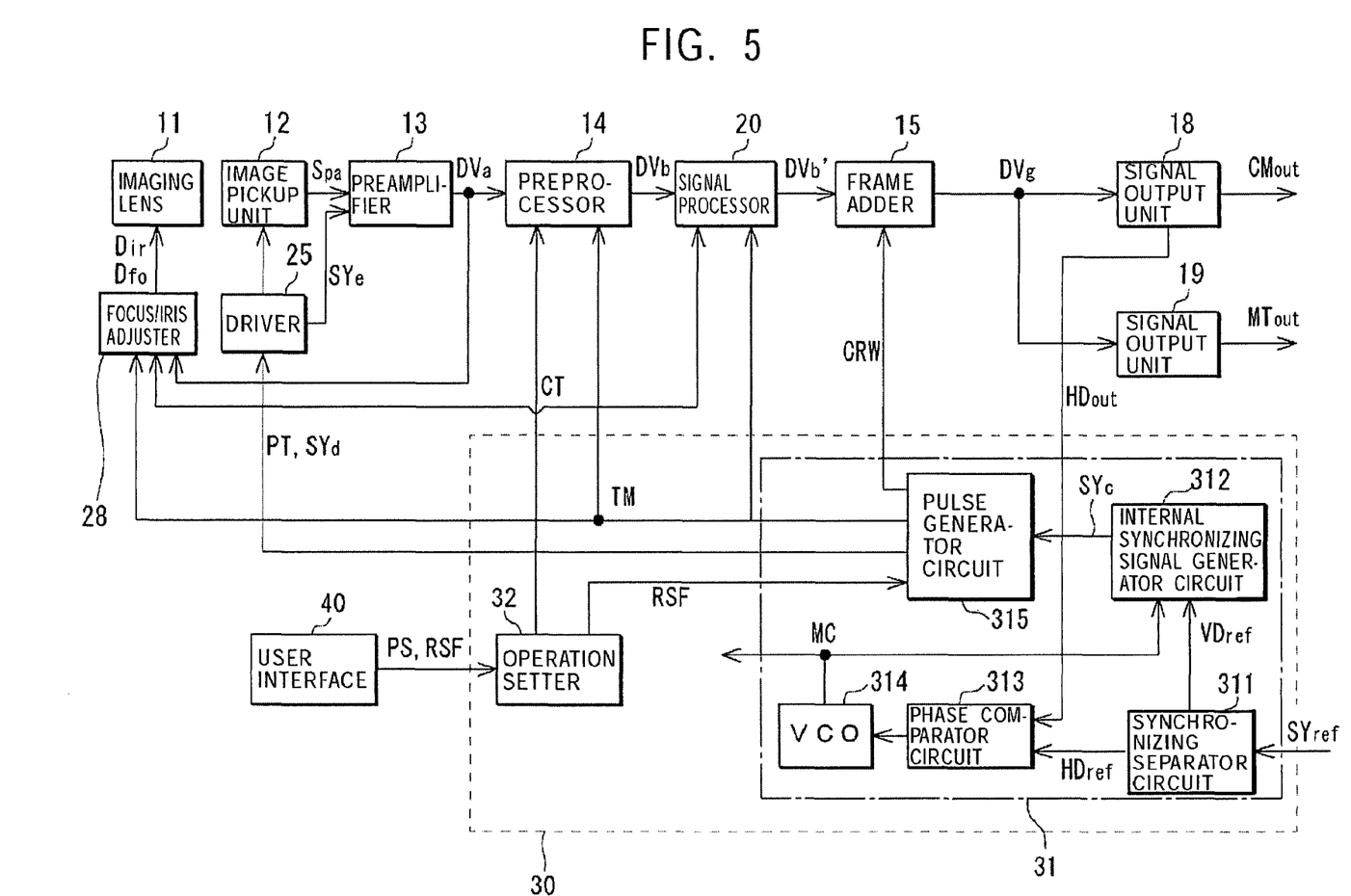
FIG. 5 illustrates another example of the configuration of the image pickup apparatus.

In the above-described embodiment, the main-line signal processor 16 and the monitor signal processor 17 perform different signal processing operations. However, if the same processing can be performed in the main-line signal processor 16 and the monitor signal processor 17, such processing may be performed before frame addition processing. An example of the configuration of such a modification is shown in FIG. 5. In FIG. 5, elements corresponding to those shown in FIG. 1 are designated with like reference numerals, and a detailed explanation thereof is thus omitted.

The image signal DVb generated in the preprocessor 14 is supplied to a signal processor 20. The signal processor 20 performs processing, such as γ correction and knee correction, as in the main-line signal processor 16 and the monitor signal processor 17, and supplies a resulting image signal DVb' to the frame adder 15.

The frame adder 15 performs frame addition by using the image signal DVb', and supplies a resulting signal DVg to the signal output units 18 and 19. The signal output units 18 and 19 generate and output signals CMout and MTout, respectively, based on the image signal DVg.

As in the preprocessor 14, even if the setting of the signal processing operation is changed by the setting signal CT from the operation setter 32, the signal processor 20 starts the signal processing operation with the new setting after the frame addition period is finished. Thus, an image signal subjected to, for example, γ correction or knee correction, before the setting is changed and an image signal subjected to, for example, γ correction or knee correction, after the setting is changed are not added to each other. Thus, the resulting image reflects the new setting of the signal processing operation.

Figure 6:
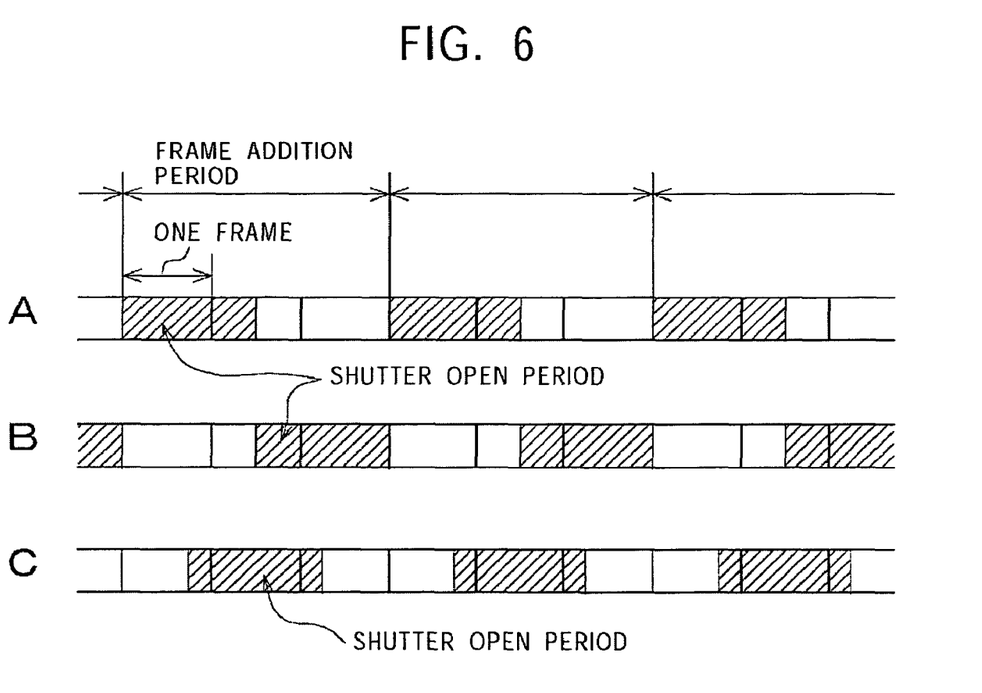
FIG. 6 illustrates the shutter operation.

To perform the electronic shutter operation by adjusting the electric charge storage period in the image pickup unit 12, shutter open periods are continuously set in a frame addition period represented by the determination signal TM. For example, if the output frame rate is set as 20P, the number of frames added FA is 3 and the imaging frame rate FRp is 60P, as is seen from FIG. 2. Accordingly, shutter open periods are continuously set for three frames, as shown in FIG. 6. Shutter open periods can be set in any position within the frame addition period as long as they are continuously disposed. For example, shutter open periods may be provided at the start of the frame addition period, as indicated by A of FIG. 6. Shutter open periods may be provided at the end of the frame addition period, as indicated by B of FIG. 6. Alternatively, shutter open periods may be disposed in the middle of the frame addition period, as indicated by C of FIG. 6.

Pseudo-contour can be prevented if shutter open periods are continuously provided within the frame addition period. If frames are added while shutter open periods are provided in units of frames, the resulting image becomes discontinuous with pseudo-contour. However, since shutter open periods are continuously provided in the frame addition period, pseudo-contour can be prevented. Instead of the electronic shutter, a mechanical shutter or an optical shutter may be used for continuously providing shutter open periods in the frame addition period, in which case, images without pseudo-contour can also be obtained.

In the above-described embodiment, when changing the setting of the signal processing operation performed in the preprocessor 14 or the signal processor 20, the signal processing operation is restarted with the new setting after the frame addition period is finished based on the determination signal TM. However, when changing the setting of the signal processing operation by the operation setter 32, the operation setter 32 may specify the timing of a change at the start or at the end of the frame addition period. Accordingly, the resulting image reflects the new setting of the signal processing operation. In this case, it is not necessary to supply the determination signal TM to the preprocessor 14 or the signal processor 20 to inform it of the timing of a change of setting. If the setting of the operation is changed at the start of the frame addition period, frame addition can be started on an image signal subjected to the processing with the new setting. If the setting of the operation is changed at the end of the frame addition period, frame addition can be performed on an image signal in the subsequent frame addition period.

When the amount of information for an instruction to change the operation to be supplied to the preprocessor 14 or the signal processor 20 is large, the frame addition period could be started while the information is being transmitted. In this case, information for the new setting of the operation is reported to the preprocessor 14 or the signal processor 20, and then, after the frame addition period is finished, the operation is started with the new setting based on the determination signal TM. Thus, the image reflecting the new setting of the signal processing operation can be obtained.

What is claimed is:

1. An image pickup apparatus comprising:
    an image pickup portion for picking up a subject image to generate an image signal with an imaging frame rate;
    a frame addition portion for conducting frame addition by using the image signal; and
    a control portion for controlling an operation of the image pickup apparatus in units of frame addition periods;
    wherein the control portion generates an image signal reflecting a new setting of an image processing operation even if the frame rate is changed during frame addition processing;
    wherein the image size of the imaging signal in an effective frame period is not changed when the imaging frame rate (FRp) is varied, and
    wherein the frame addition portion generates a plurality of output frame images, with a set frame rate that is changed by switching the imaging frame rate and the number of frames added,
    wherein when a new set frame rate is selected for the control portion, the imaging frame rate of the image pickup portion is determined according to the new set frame rate and a predetermined number of added frames that is determined according to the new set frame rate,
    wherein when changing a setting of the image processing operation, the image processing operation is restarted with the new setting after the frame addition portion is finished based on a determination signal,
    wherein, when changing the setting of the image processing operation, a timing of a change at the start or at the end of the frame addition period is specified,
    wherein, a resulting image reflects the new setting of the image processing operation,
    wherein if the setting of the image processing operation is changed at the start of the frame addition portion, frame addition can be started on an image signal subjected to the image processing operation with the new setting, and
    wherein if the setting of the operation is changed at the end of the frame addition portion, frame addition can be performed on an image signal in the subsequent frame addition portion.

2. The image pickup apparatus according to claim 1, further comprising:
    a signal processing portion for performing a signal processing operation by using the image signal generated by the image pickup portion,
    wherein the frame addition portion conducts the frame addition by using an image signal obtained by the signal processing portion, and the control portion controls an operation of the signal processing portion in units of frame addition periods so as to control the operation of the image pickup apparatus.

3. The image pickup apparatus according to claim 2,
    wherein the control portion comprises: a signal generating portion for generating a determination signal indicating a frame addition period, and when an instruction to change the signal processing operation is given from the control portion, the signal processing portion changes, based on the determination signal, the signal processing operation from an image signal in the frame addition period after the instruction is given.

4. The image pickup apparatus according to claim 2, wherein the control portion instructs the signal processing portion to change the signal processing operation at the start or at the end of the frame addition period.

5. The image pickup apparatus according to claim 1, further comprising:

an automatic adjustment portion for making an automatic adjustment to optimize an image pickup operation, wherein the control portion controls the automatic adjustment portion to perform the automatic adjustment in units of frame addition periods so as to control the operation of the image pickup apparatus.

6. The image pickup apparatus according to claim 5, wherein the automatic adjustment portion conducts at least one of a focus adjustment, an iris adjustment, and white balance control.

* * * * *